US012572341B2

(12) United States Patent
Xue et al.

(10) Patent No.: US 12,572,341 B2
(45) Date of Patent: Mar. 10, 2026

(54) COMPILING TENSOR OPERATORS FOR NEURAL NETWORK MODELS BASED ON TENSOR TILE CONFIGURATIONS

(71) Applicant: Microsoft Technology Licensing, LLC, Redmond, WA (US)

(72) Inventors: Jilong Xue, Beijing (CN); Lingxiao Ma, Beijing (CN); Yuqing Xia, Beijing (CN); Wei Cui, Beijing (CN); Fan Yang, Beijing (CN); Mao Yang, Beijing (CN); Lidong Zhou, Beijing (CN)

(73) Assignee: Microsoft Technology Licensing, LLC., Redmond, WA (US)

( * ) Notice: Subject to any disclaimer, the term of this patent is extended or adjusted under 35 U.S.C. 154(b) by 898 days.

(21) Appl. No.: 17/853,488

(22) Filed: Jun. 29, 2022

(65) Prior Publication Data

US 2024/0004718 A1    Jan. 4, 2024

(51) Int. Cl.
*G06F 8/41* (2018.01)
*G06F 9/50* (2006.01)

(52) U.S. Cl.
CPC .............. *G06F 8/453* (2013.01); *G06F 8/443* (2013.01); *G06F 8/447* (2013.01); *G06F 9/5072* (2013.01)

(58) Field of Classification Search
None
See application file for complete search history.

(56) References Cited

U.S. PATENT DOCUMENTS 11,237,971 B1    2/2022  Brown et al.
2023/0315802 A1*  10/2023  Wang .................... G06F 8/4441
                                                      708/200

FOREIGN PATENT DOCUMENTS

WO        2021084506 A1      5/2021

OTHER PUBLICATIONS

Vedurada et al; TTLG—An Efficient Tensor Transposition Library for GPUs; IEEE 2018 (Year: 2018).*
"A Fast and Versatile Library for Linear and Tensor Algebra", Retrieved from: http://web.archive.org/web/20170519140220/http:/tensor-compiler.org/, May 19, 2017, 2 Pages.
"AMD Radeon Instinct™ MI50 Accelerator", Retrieved from: https://web.archive.org/web/20181122160018/https:/www.amd.com/en/products/professional-graphics/instinct-mi50, Nov. 22, 2018, 3 Pages.
"CuBLAS Library", In User Guide of NVIDIA, DU-06702-001_v11.7, May 2022, 254 Pages.
"CUDA Compiler Driver NVCC", In Reference Guide of NVIDIA, TRM-06721-001_v11.7, May 2022, 62 Pages.
(Continued)

*Primary Examiner* — Bing Zhao
(74) *Attorney, Agent, or Firm* — Foley IP Law, PLLC

(57)                ABSTRACT

Embodiments of the present disclosure include systems and methods for compiling tensor operators for neural network models based on tensor tile configurations. A tensor expression for a neural network model is received. A tensor tile configuration for the tensor expression is determined based on specifications associated with a set of hardware devices. Based on the tensor tile configuration, a set of code for implementing the tensor expression for the neural network model is generated. The set of code is for execution on the set of hardware.

20 Claims, 10 Drawing Sheets

(56)               References Cited

OTHER PUBLICATIONS

"IPU Programmer's Guide", Retrieved from: https://web.archive. org/web/20220327163228/https://docs.graphcore.ai/projects/ipu-overview/en/latest/, Mar. 27, 2022, 1 Page.
"MLIR", Retrieved from: https://web.archive.org/web/20220421204035/ https://mlir.llvm.org/, Apr. 21, 2022, 3 Pages.
"NVIDIA cuDNN", Retrieved from: https://web.archive.org/web/ 20220415102939/https:/developer.nvidia.com/cudnn, Apr. 15, 2022, 3 Pages.
"NVIDIA TensorRT", In Developer Guide of NVIDIA, PG-08540-001_v8.0.2, Aug. 2021, 160 Pages.
"ONNX", Retrieved from: https://web.archive.org/web/ 20171015171740/https:/onnx.ai/, Oct. 15, 2017, 3 Pages.
"XLA: Optimizing Compiler for Machine Learning", Retrieved from: https://www.tensorflow.org/xla, Dec. 2, 2012, 7 Pages.
Abadi, et al., "TensorFlow: A System for Large-Scale Machine Learning", In Proceedings of the 12th USENIX Symposium on Operating Systems Design and Implementation, Nov. 2, 2016, pp. 265-283.
Aharoni, et al., "HeLayers: A Tile Tensors Framework for Large Neural Networks on Encrypted Data", In Repository of arXiv:2011. 01805v2, Dec. 7, 2021, 17 Pages.
Aharoni, et al., "Tile Tensors: A Versatile Data Structure with Descriptive Shapes for Homomorphic Encryption", In Repository of arXiv:2011.01805v1, Nov. 3, 2020, 17 Pages.
Baghdadi, et al., "Tiramisu: A Polyhedral Compiler for Expressing Fast and Portable Code", In Proceedings of the IEEE/ACM International Symposium on Code Generation and Optimization, Feb. 16, 2019, pp. 193-205.
Chen, et al., "Learning to Optimize Tensor Programs", In Journal of Advances in Neural Information Processing Systems, vol. 31, Dec. 3, 2018, 12 Pages.
Chen, et al., "TVM: An Automated End-to-End Optimizing Compiler for Deep Learning", In Proceedings of the 13th USENIX Symposium on Operating Systems Design and Implementation, Oct. 8, 2018, pp. 579-594.
Devlin, et al., "BERT: Pre-training of Deep Bidirectional Transformers for Language Understanding", In Repository of arXiv:1810. 04805v1, Oct. 11, 2018, 14 Pages.
Feng, Siyuan, "[RFC] TensorIR: A Schedulable IR for TVM", Retrieved from: https://discuss.tvm.apache.org/t/rfc-tensorir-a-schedulable-ir-for-tvm/7872, Sep. 2020, 11 Pages.
Georganas, et al., "Tensor Processing Primitives: A Programming Abstraction for Efficiency and Portability in Deep Learning Workloads", In Repository of arXiv:2104.05755v1, Apr. 12, 2021, 14 Pages.
He, et al., "Deep Residual Learning for Image Recognition", In Proceedings of IEEE Conference on Computer Vision and Pattern Recognition, Jun. 27, 2016, pp. 770-778.
Hochreiter, et al., "Long Short-Term Memory", In Journal of Neural Computation, vol. 9, Issue 8, Nov. 15, 1997, 32 Pages.
Jia, et al., "Dissecting the Graphcore IPU Architecture via Microbenchmarking", In Repository of arXiv:1912.03413v1, Dec. 7, 2019, 91 Pages.
Jia, et al., "Dissecting the NVIDIA Volta GPU Architecture via Microbenchmarking", In Repository of arXiv:1804.06826v1, Apr. 18, 2018, 66 Pages.
Kerr, et al., "NVIDIA / cutlass", Retrieved from: https://github.com/ NVIDIA/cutlass, Jul. 2, 2022, 15 Pages.

Kim, Jinsung, "Optimizing Tensor Contractions on GPUs", A Dissertation Presented in Partial Fulfillment of the Requirements for the Degree Doctor of Philosophy in the Graduate School of the Ohio State University, 2019, 131 Pages.
Lavin, et al., "Fast Algorithms for Convolutional Neural Networks", In Proceedings of the IEEE Conference on Computer Vision and Pattern Recognition, Jun. 27, 2016, pp. 4013-4021.
Li, et al., "Analytical Characterization and Design Space Exploration for Optimization of CNNs", In Proceedings of the 26th ACM International Conference on Architectural Support for Programming Languages and Operating Systems, Apr. 19, 2021, pp. 928-942.
Li, et al., "The Deep Learning Compiler: A Comprehensive Survey", In Repository of arXiv:2002.03794v4, Aug. 28, 2020, 34 Pages.
Ma, et al., "Rammer: Enabling Holistic Deep Learning Compiler Optimizations with rTasks", In Proceedings of the 14th USENIX Symposium on Operating Systems Design and Implementation, Nov. 4, 2020, pp. 881-897.
Malavally, et al., "RadeonOpenCompute / ROCm", Retrieved from: https://github.com/RadeonOpenCompute/ROCm, Jun. 29, 2022, 26 Pages.
Prasanna, Shashank, "A Complete Guide to AI Accelerators for Deep Learning Inference—GPUs, AWS Inferentia and Amazon Elastic Inference", Retrieved from: https://towardsdatascience.com/ a-complete-guide-to-ai-accelerators-for-deep-learning-inference-gpus-aws-inferentia-and-amazon-7a5d6804ef1c, Oct. 21, 2020, 50 Pages.
Ragan-Kelley, et al., "Halide: A Language and Compiler for Optimizing Parallelism, Locality, and Recomputation in Image Processing Pipelines", In Proceedings of the 34th ACM SIGPLAN Conference on Programming Language Design and Implementation, Jun. 16, 2013, pp. 519-530.
Springer, et al., "HPTT: A High-Performance Tensor Transposition C++ Library", In Repository of arXiv:1704.04374v2, May 10, 2017, 7 Pages.
Tillet, et al., "Triton: An Intermediate Language and Compiler for Tiled Neural Network Computations", In Proceedings of the 3rd ACM SIGPLAN International Workshop on Machine Learning and Programming Languages, Jun. 22, 2019, pp. 10-19.
Tollenaere, et al., "Efficient Convolution Optimisation by Composing Micro-Kernels", Retrieved from: https://hal.archives-ouvertes. fr/hal-03149553v3/document, Oct. 14, 2021, 23 Pages.
Vasilache, et al., "Tensor Comprehensions: Framework-Agnostic High-Performance Machine Learning Abstractions", In Repository of arXiv:1802.04730v1, Feb. 13, 2018, 39 Pages.
Zhao, et al., "AKG: Automatic Kernel Generation for Neural Processing Units using Polyhedral Transformations", In Proceedings of the 42nd ACM SIGPLAN International Conference on Programming Language Design and Implementation, Jun. 20, 2021, pp. 1233-1248.
Zheng, et al., "Ansor: Generating High-Performance Tensor Programs for Deep Learning", In Proceedings of 14th USENIX Symposium on Operating Systems Design and Implementation, Nov. 4, 2020, pp. 863-879.
Zheng, et al., "FlexTensor: An Automatic Schedule Exploration and Optimization Framework for Tensor Computation on Heterogeneous System", In Proceedings of the Twenty-Fifth International Conference on Architectural Support for Programming Languages and Operating Systems, Mar. 16, 2020, pp. 859-873.
Zoph, et al., "Learning Transferable Architectures for Scalable Image Recognition", In Proceedings of the IEEE/CVF Conference on Computer Vision and Pattern Recognition, Jun. 18, 2018, pp. 8697-8710.

* cited by examiner

Tensor Tile Configuration

Load: L2 -> L1 -> L0
Compute: L0
Store: L0 -> L2
Tile Configuration: L1=[4, 8, 4], L0=[2, 2, 1]

400

600

```
for L1_iter in L2_rtile.split(L1_rtile ):
    L1_input_tiles = Load(L1_iter ); //L2 to L1
    for L0_iter in L1_rtile.split(L0_rtile ):
        L0_input_tiles = Load(L0_iter) //L1 to L0
        L0_out_tile = Compute( L0_input_tiles );
        Store(L0_out_tile , L2_out_tile ); //L0 to L2
```

Hardware Execution Unit
705

L0

515    530

545

L1

510    525

L2

520

505    535

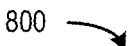

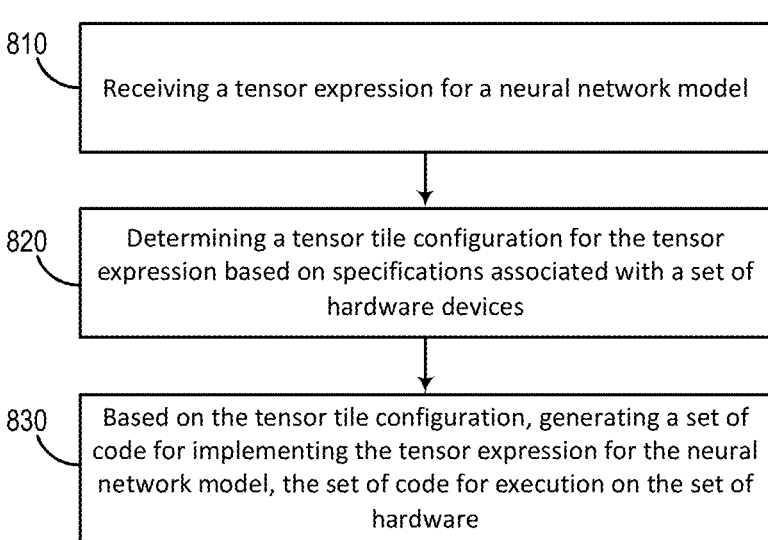

810   Receiving a tensor expression for a neural network model

820   Determining a tensor tile configuration for the tensor expression based on specifications associated with a set of hardware devices 830   Based on the tensor tile configuration, generating a set of code for implementing the tensor expression for the neural network model, the set of code for execution on the set of hardware

*FIG. 8*

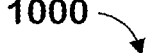
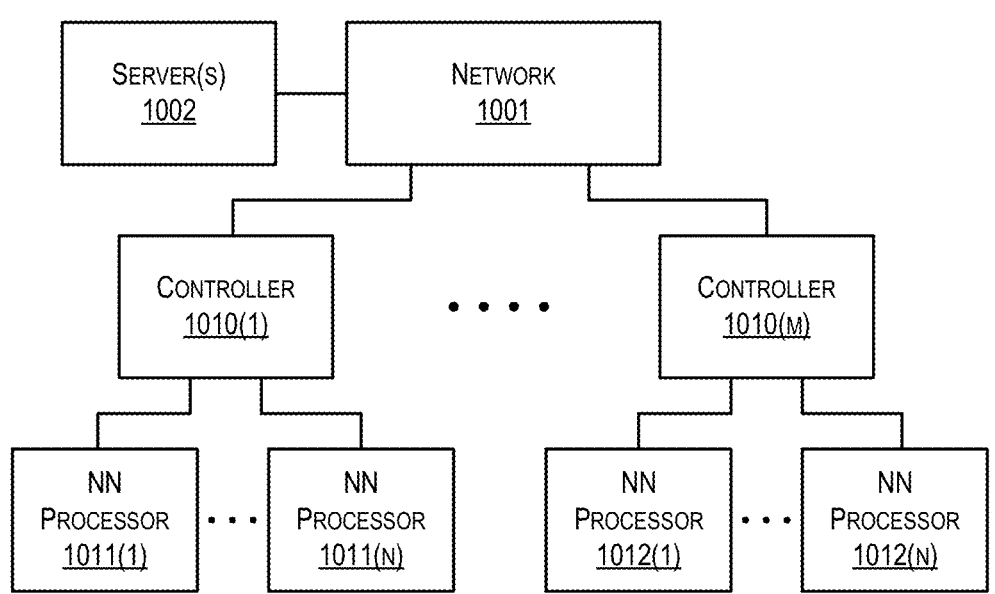
*FIG. 10*

COMPILING TENSOR OPERATORS FOR NEURAL NETWORK MODELS BASED ON TENSOR TILE CONFIGURATIONS

BACKGROUND

The present disclosure relates to a computing system. More particularly, the present disclosure relates to techniques for building programs for neural network models.

A neural network is a machine learning model used for a variety of different applications (e.g., image classification, computer vision, natural language processing, speech recognition, writing recognition, etc.). A neural network may be trained for a particular purpose by running datasets through it, comparing results from the neural network to known results, and updating the network based on the differences.

Deep neural networks (DNNs) have grown exponentially in size over the past years in order to achieve better accuracies. Despite their high accuracies, DNNs typically need significant computational cost both in training and inference. Different types of techniques can be used to reduce computations costs associated with DNNs and/or reduce the size of DNNs.

BRIEF DESCRIPTION OF THE DRAWINGS

Various embodiments of the present disclosure are illustrated by way of example and not limitation in the figures of the accompanying drawings.

FIG. 6 illustrates an example pseudocode of the example tensor operator illustrated in FIG. 5 according to some embodiments.

FIG. 8 illustrates a process for compiling a tensor operator for a neural network model based on a tensor tile configuration according to some embodiments.

FIG. 10 illustrates a neural network processing system according to some embodiments.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

Described here are techniques for compiling tensor operators for neural network models based on tensor tile configurations. In some embodiments, a computing system may receive a set of tensor expressions for a neural network model. In response, the computing system can determine a tensor tile configuration for each of the tensor expressions. For example, for a tensor tile configuration for a tensor expression, the computing system may determine a tensor tile shape for a set of memory layers of a memory architecture of a hardware device on which the tensor expression is to be executed. The tensor tile shapes are determined based on a number of different rules. Some of the rules are based on the hardware device that will be used to execute the tensor expression (e.g., the number of threads that can be executed concurrently by execution units included in a hardware device, the length of memory transactions utilized by a hardware device, etc.). Some of the rules are based on the tensor expression (e.g., the shape of the input tensors). Next, the computing system generates code for implementing each tensor expression in the neural network model based on the tensor tile configuration associated with the tensor expression. The generated code can be executed on the hardware device in order to implement set of tensor expressions for the neural network model.

Figure 1:
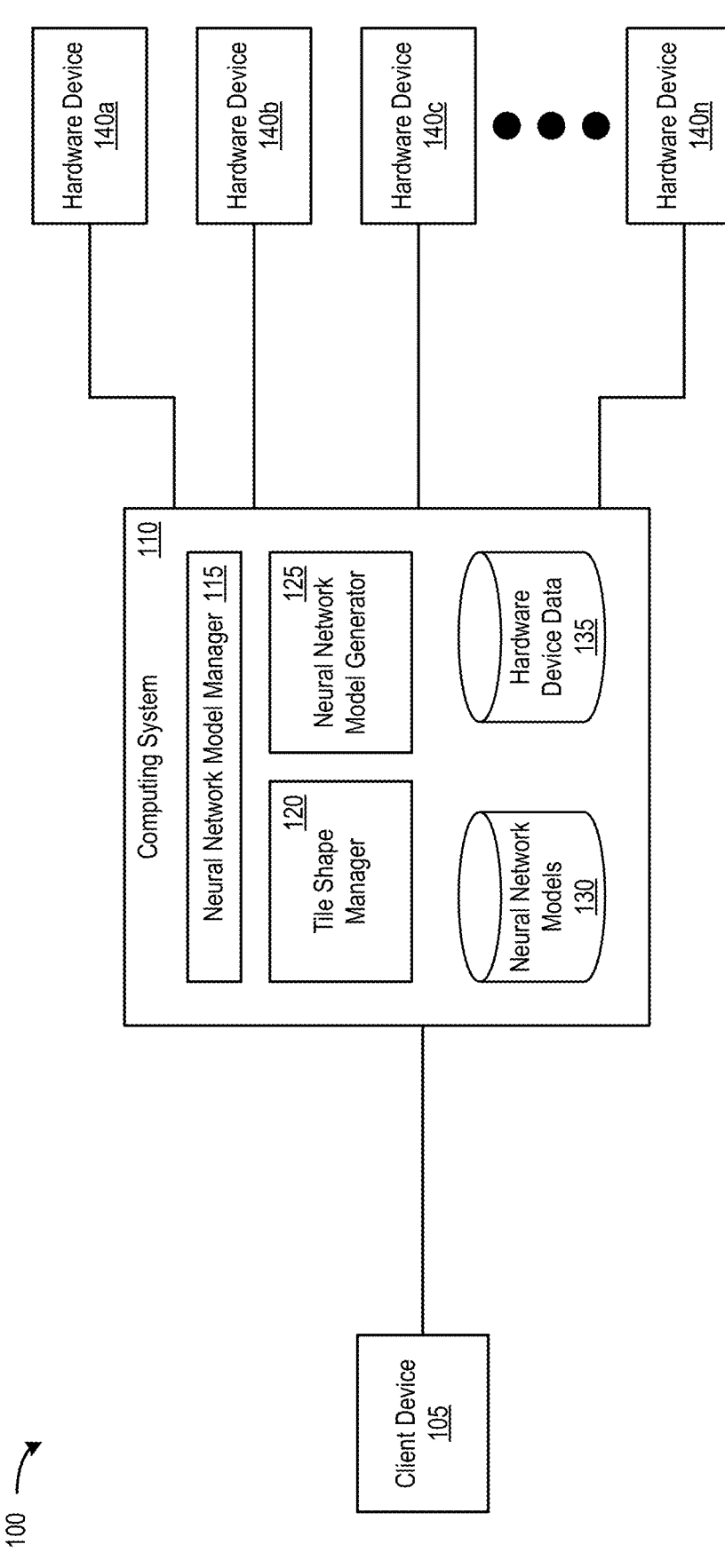
FIG. 1 illustrates a system for compiling tensor operators for neural network models based on tensor tile configurations according to some embodiments.

FIG. 1 illustrates a system 100 for compiling tensor operators for neural network models based on tensor tile configurations according to some embodiments. As shown, system 100 includes client device 105, computing system 110, and hardware devices 140a-n. Client device 105 is configured to interact and communicate with computing system 110. For instance, a user of client device 105 can send computing system 110 a set of tensor expressions for a neural network model. The following is an example tensor expression:

$$C = \text{compute } ((M,N), \text{lambda } i,j: \text{sum}(A[i,k]*B[k,j]))$$

where M is the number of rows in the output tensor C, N is the number of columns in the output tensor C, i is the index of a row in the input tensor A, k is the index of a column in the input tensor A and the index of a row in the input tensor B, j is the index of a column in the input tensor B, and the element indexed by (i, j) in C is computed by a sum reduction over the elements in row i of A and column j of B with k as the reduction axis. This example tensor expression specifies a matrix multiplication operator that takes tensors A and B as inputs, performs matrix multiplication on tensors A and B, and stores the results of the matrix multiplication operation in an output tensor C.

Each of the hardware devices 140a-n is configured to implement and execute neural network models. Hardware devices 140a-n may include graphics processors (GPUs), AI accelerators, or other digital processors optimized for AI operations. In some cases, a hardware device 140 may receive a neural network model and a set of training data from computing system 110 along with instructions how to train the neural network model. In response, the hardware device 140 uses the set of training data to train the neural network model according to the instructions. In other cases, a hardware device 140 can receive a trained neural network model and input data from computing system 110. In response, the hardware device 140 executes the trained neural network model base on the input data in order to generate a set of outputs (e.g., using the trained neural network model for inference). FIG. 1 shows hardware devices 140a-n as being external to computing system 110.

One of ordinary skill in the art will appreciated that some or all of the hardware devices 140*a-n* may be part of computing system 110 in some embodiments.

As shown in FIG. 1, computing system 110 includes neural network model manager 115, tile shape manager 120, tensor operator generator 125, neural network models storage 130, and hardware device data storage 135. Neural network models storage 130 is configured to store neural network models, tensor expressions defined for neural network models, executable neural network models, training data for training neural network models, trained neural network models, etc. Hardware device data storage 135 is configured to store data associated with hardware devices 140*a-n*. Examples of such data include the number of threads (e.g., the warp size) that can be executed concurrently by execution units included in a hardware device, the length of memory transactions utilized by a hardware device, the number of memory banks utilized by a hardware device, etc. In some embodiments, storages 130 and 135 are implemented in a single physical storage while, in other embodiments, storages 130 and 135 may be implemented across several physical storages. While FIG. 1 shows storages 130 and 135 as part of computing system 110, one of ordinary skill in the art will appreciate that neural network models storage 130 and/or hardware device data storage 135 may be external to computing system 110 in some embodiments.

Neural network model manager 115 is responsible for managing neural network models. For example, neural network model manager 115 may receive a set of tensor expressions for a neural network model from client device 105. In some embodiments, neural network model manager 115 can receive a set of tensor expressions for a neural network model from any number of different sources. For instance, neural network model manager 115 may receive a set of tensor expressions for a neural network model from an application, service, or the like, operating on computing system 110. Once neural network model manager 115 receives a set of tensor expressions for a neural network model, neural network model manager 115 sends them to tile shape manager 120 for processing. In some cases, neural network model manager 115 stores the set of tensor expressions for the neural network model in neural network models storage 130.

Additionally, neural network model manager 115 can receive from tile shape manager 120 a set of tensor tile configurations for the set of tensor expressions for the neural network model. In response, neural network model manager 115 sends the set of tensor tile configurations and the set of tensor expressions for the neural network mode to tensor operator generator 125 for further processing. Neural network model manager 115 may then receive an executable neural network model from tensor operator generator 125. Neural network model manager 115 can store it in neural network models storage 130.

Neural network model manager 115 also trains neural network models and uses them for inference. For instance, neural network model manager 115 may receive (from client device 105 or an application or service operating on computing system 110) a request to train a neural network model. In response to the request, neural network model manager 115 accesses neural network models storage 130 to retrieve the requested executable neural network model and a set of training data. Then, neural network model manager 115 sends one or more of the hardware devices 140*a-n* the neural network model, the set of training data, and instructions how to train the neural network model. After the neural network model is trained, neural network model manager 115 stores the trained neural network model in neural network models storage 130. As another example, neural network model manager 115 receive (from client device 105 or an application or service operating on computing system 110) a request to use a trained neural network model for inference along with a set of input data. In response to the request, neural network model manager 115 accesses neural network models storage 130 to retrieve the trained neural network model. Next, neural network model manager 115 sends the trained neural network model and the set of input data to one or more of the hardware devices 140*a-n* for processing. In some cases, neural network model manager 115 stores in neural network models storage 130 the set of outputs generated by the neural network model based on the set of input data.

Tile shape manager 120 is configured to determine tensor tile configurations for tensor expressions for neural network models. For example, tile shape manager 120 may receive from neural network model manager 115 a set of tensor expressions for a neural network model. In response to receiving the set of tensor expressions, tile shape manager 120 determines a tensor tile configuration for each tensor expression in the set of tensor expressions. Then, tile shape manager 120 sends the tensor tile configurations to neural network model manager 115.

To determine a tensor tile configuration for a tensor expression, tile shape manager 120 can determine a tensor tile shape for a set of memory layers of a memory architecture of a hardware device 140 on which the tensor expression is to be executed. For example, for a given tensor expression and a particular hardware device 140, tile shape manager 120 may access hardware device data storage 135 to retrieve the hardware device data associated with the particular hardware device 140. The retrieved hardware device data can include the number of memory layers in the memory architecture of the particular hardware device 140. Next, tile shape manager 120 starts at the top memory layer of the memory architecture of the particular hardware device 140 and determines the optimal tile shape for the top memory layer. Then, tile shape manager 120 continues to determine optimal tile shape for the next highest memory layer until tile shape manager 120 reaches the lowest memory layer of the memory architecture of the particular hardware device 140.

Figure 2:
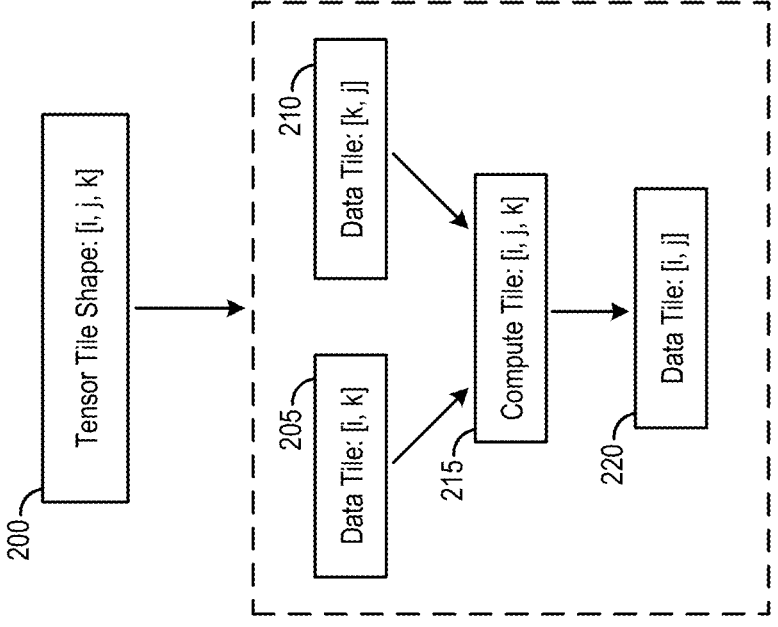
FIG. 2 illustrates an example of a tensor tile shape definition according to some embodiments.

FIG. 2 illustrates an example of a tensor tile shape definition 200 according to some embodiments. Specifically, FIG. 2 illustrates the data tiles and computing tiles inferred from a tensor tile shape definition. In this example, tensor tile shape definition 200 defines a tensor tile shape for a tensor expression that specifies a matrix multiplication operator. As shown, tensor tile shape definition 200 specifies a tensor tile shape of [i, j, k]. From a tensor tile shape definition, data tiles can be inferred. Referring to FIG. 2 as an example, data tile 205 with dimension i by k and data tile 210 with dimension k by j can be inferred from tensor tile shape definition 200. Compute tile 215 indicates that a matrix multiplication operation is performed on data tiles 205 and 210. The output of the matrix multiplication operation is stored in data tile 220, which is inferred from tensor tile shape definition 200 to have a dimension of i by j.

Returning to FIG. 1, tile shape manager 120 may determine the optimal tile shape at a particular memory layer by determining a valid tensor tile shape and determining memory metrics associated with the valid tensor tile shape.

An example of a memory metric associated with a valid tensor tile shape is the following data reuse score:

$$S_i = \frac{Q(T) - Q(T_i')}{F(T_i') - F(T)}$$

where $S_i$ is the data reuse score for axis i, T is a given tensor tile shape, T' is an enlarged tensor tile shape by replacing the dimension size at axis i with the next aligned size, function $Q(T)$ calculates the memory traffic, and function $F(T)$ calculates the memory footprint when the computation is executed in the granularity of T. In some embodiments, functions $Q(T)$ and $F(T)$ can be directly inferred based on the given tensor expression and the hardware device data associated with the particular hardware device 140. Tile shape manager 120 repeatedly determines a different valid tensor tile shape and its associated memory metrics until the memory footprint at the particular memory layer is greater than a defined memory capacity (e.g., the maximum memory capacity) of the particular memory layer or the memory performance at the particular memory layer is greater than a defined memory performance (e.g., the compute performance at the top memory layer). Then, tile shape manager 120 selects a tensor tile shape that has the highest memory metric as the tensor tile shape for the particular memory layer.

Tile shape manager 120 may determine valid tensor tile shapes based on a set of defined rules. One such rule is that the size of a tensor tile shape is a multiple of the number of threads (e.g., the warp size) that can be executed concurrently by execution units included in a hardware device 140. For example, if the number of threads that can be executed concurrently by execution units included in a hardware device 140 is 32, then the size of a valid tensor tile shape is a multiple of 32. Another defined rule may be that the inner-most dimension of inferred input and output data tiles inferred from a tensor tile shape (e.g., data tiles 205, 210, and 220 inferred from tensor tile shape definition 200) is a multiple of the length of memory transactions utilized by a hardware device 140. For example, if the length of memory transactions utilized by a hardware device 140 is 4, then the inner-most dimension of the inferred input and output data tiles of a valid tensor tile shape is a multiple of 4.

Yet another rule that can be used to determine valid tensor tile shapes is that the shape of the input tensors of a tensor expression are evenly partitioned by a valid tensor tile shape. In some embodiments, tile shape manager 120 may pad the input tensors so that the input tensors can be evenly partitioned by a particular tensor tile shape. In some such embodiments, tile shape manager 120 uses the following equation (1) to limit the amount of padding that can be added to input tensors:

$$\frac{S_i - N_i \% S_i}{N_i} \leq \varepsilon$$

where $S_i$ is the size of a dimension i of a tensor tile shape, $N_i$ is the size of a dimension i of an input tensor, and $\varepsilon$ is a defined value. Tile shape manager 120 applies padding when equation (1) is true.

Figure 3:
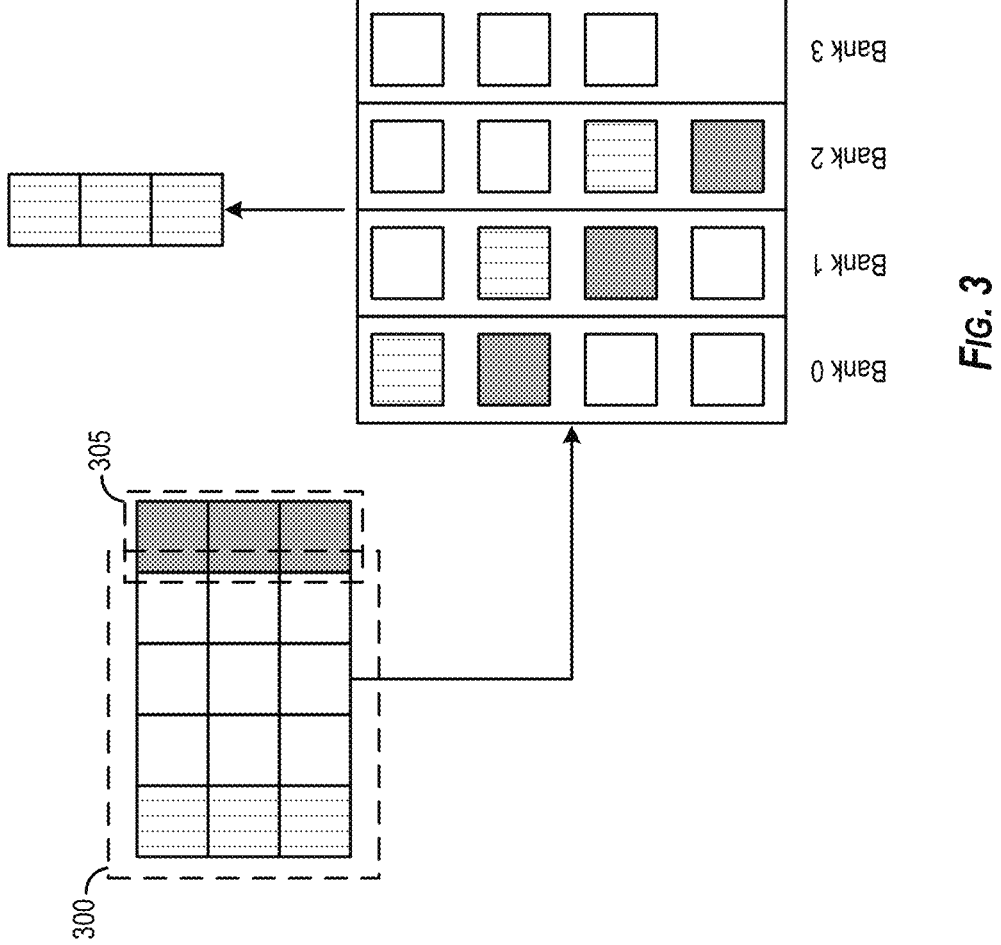
FIG. 3 illustrates an example data tile stored in memory banks according to some embodiments.

In some embodiments, tile shape manager 120 determines a padding amount for data tiles in order to optimize memory performance. For example, tile shape manager 120 may add an amount of padding to a data tile so that the data tile is stored in memory banks in a manner that avoids read conflicts. An example of such padding technique will be described by reference to FIG. 3. FIG. 3 illustrates an example data tile 300 stored in memory banks according to some embodiments. In this example, data tile 300 is a 3 by 4 tensor and a hardware device 140 stores data arranged in memory banks 0-3. Generally, tensor 300 would be stored in memory banks 0-3 in row-major fashion. That is, the elements are stored in a row-by-row manner where each element in a row is stored in a successive memory bank. For this example, the first element in the first row of data tile 300 is stored in memory bank 0, the second element in the first row of data tile 300 is stored in memory bank 1, the third element in the first row of data tile 300 is stored in memory bank 2, the fourth element in the first row of data tile 300 is stored in memory bank 3, the first element in the second row of data tile 300 is stored in memory bank 0, and so on and so forth. When storing data tile 300 in this way, the elements in a column of data tile 300 are stored in the same memory bank. This can cause read conflicts when a column of data tile 300 is accessed. To avoid such read conflicts, tile shape manager 120 may determine an amount of padding to add to a data tile. In some embodiments, tile shape manager 120 uses the following equation (2) to determine an amount of padding to add:

$$P = (BL - N\%(BL)) + L\left\lceil \frac{n}{L} \right\rceil \%(BL)$$

where N is the leading dimension of a first data tile, n is the leading dimension of a second data tile that reads the first data tile, B is the number of memory banks, L is the width of each memory bank, and P is the amount of padding to add to N when storing the first data tile. For the example depicted in FIG. 3, tile shape manager 120 uses equation (2) to determine that padding 305 is to be added to data tile 300 in order to avoid read conflicts when accessing columns of data tile 300. FIG. 3 illustrates how the padded data tile 300 is stored in memory banks 0-3. As shown, elements of a column data tile 300 are not stored in the same memory bank.

Returning to FIG. 1, tensor operator generator 125 handles the generation of tensor operators specified in tensor expressions based on tensor tile configurations. For instance, tensor operator generator 125 may receive from neural network model manager 115 a set of tensor tile configurations and a set of tensor expressions for a neural network mode. In response to receiving these data, tensor operator generator 125 generates a set of code for implementing the set of tensor expressions for the neural network model based on the set of tensor tile configurations. The set of code can be executed on one or more hardware devices 140a-n. In some embodiments, tensor shape generator 125 can replicate the set of code generated for one execution unit to other execution units by partitioning the computation with the lowest layer tensor tile.

An example of generating code for a tensor expression will now be described by reference to FIGS. 4-7. For this example, neural network model manager 115 receives from client device 105 a tensor expression for a neural network model similar to the example tensor expression provided above (i.e., a tensor expression that specifies a matrix multiplication operator). In response to receiving the tensor expression, neural network model manager 115 sends it to tile shape manager 120 for processing. Upon receiving the tensor expression, tile shape manager 120 determines a tensor tile configuration for the tensor expression for the neural network model.

Figure 4:
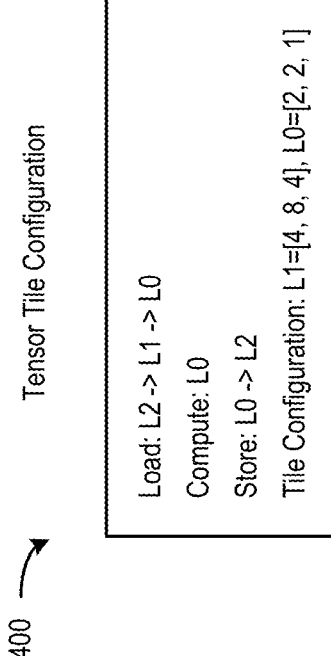
FIG. 4 illustrates an example tensor tile configuration according to some embodiments.

FIG. 4 illustrates an example tensor tile configuration 400 according to some embodiments. Specifically, tile shape manager 120 determines tensor tile configuration 400 for this example. As illustrated, tensor tile configuration 400 specifies a load operation that loads data into an L2 memory layer, which is then loaded into an L1 memory layer, which is then loaded into an L0 memory layer. Then, a compute operation is performed at the L0 memory layer. Next, the results in the L0 memory layer are stored back to the L2 memory layer. Finally, the tensor tile shape for the L1 memory layer is [4, 8, 4] and the tensor tile shape is [2, 2, 1].

Figure 5:
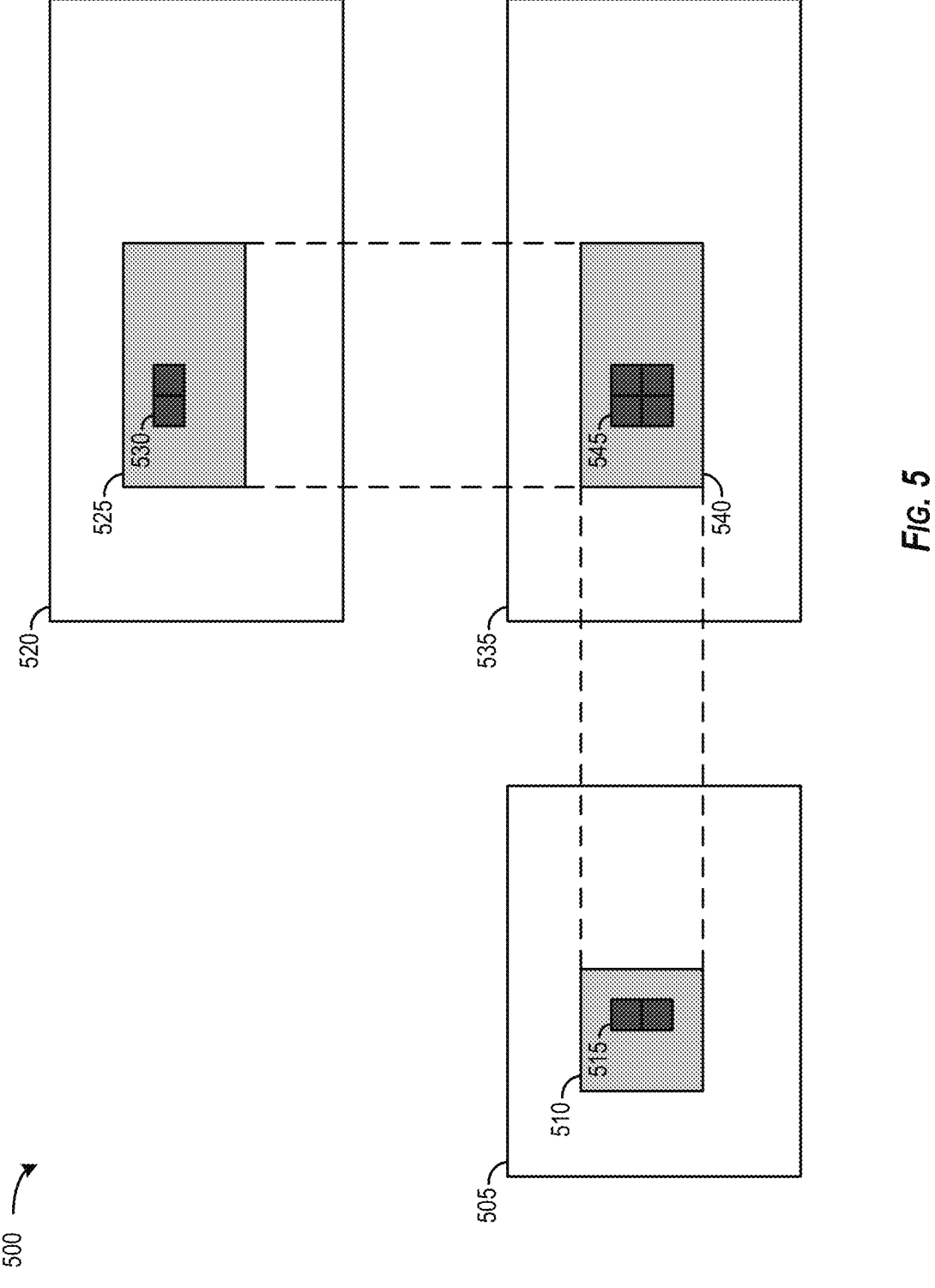
FIG. 5 illustrates an example tensor operator based on the tensor tile configuration illustrated in FIG. 4 according to some embodiments.

FIG. 5 illustrates an example tensor operator 500 based on tensor tile configuration 400 according to some embodiments. As shown in FIG. 5, tensor operator 500 is a matrix multiplication operation. In particular, a matrix multiplication operation is performed between tensor 505 and tensor 520. The output of the matrix multiplication operation is tensor 535. FIG. 5 shows how the matrix multiplication operation is implemented based on the tensor tile shapes specified in tensor tile configuration 400. Here, tensor tiles 510 and 525 represent the data tiles inferred from the tensor tile shape for the L1 memory layer. That is, tensor tile 510 is a 4 by 4 matrix and tensor tile 525 is a 4 by 8 matrix. A matrix multiplication operation is performed on tensor tiles 510 and 525 to generate an output matrix, which is tensor tile 540 in this example. For this example, tensor tiles 515 and 530 represent the data tiles inferred from the tensor tile shape for the L0 memory layer. As depicted in FIG. 5, tensor tile 515 is a 2 by 1 matrix and tensor tile 530 is a 1 by 2 matrix. A matrix multiplication operation is performed on tensor tiles 515 and 530 to generate an output matrix, which is tensor tile 545 in this example.

FIG. 6 illustrates an example pseudocode 600 of tensor operator 500 according to some embodiments. In this example, tensor operator generator 125 generates a set of code that implements the logic illustrated in pseudocode 600. The set of code can be executed on a hardware device 140. As illustrated, pseudocode 600 includes two for loops. The outer loop loading data from the L2 memory layer in the form of tiles configured for L1 memory layer into the L1 memory layer. In the inner loop, tiles configured for the L0 memory layer are loaded from the L1 memory layer into the L0 memory layer, a compute operation (matrix multiplication in this example) is performed, and the output of the compute operation is stored from the L0 memory layer back to the L2 memory layer.

Figure 7:
FIG. 7 illustrates execution of the tensor operator illustrated in FIG. 5 on a memory hierarchy of a hardware device according to some embodiments.

FIG. 7 illustrates execution of tensor operator 500 on a memory hierarchy 700 of a hardware device according to some embodiments. In some embodiments, the memory hierarchy depicted in FIG. 7 may be the memory architecture of a hardware device 140. Here, the set of code generated to implement pseudocode 600 is executed on memory hierarchy 700. As shown, memory architecture 700 includes an L2 memory layer, an L1 memory layer, an L0 memory layer, and hardware execution unit 705. Tensors 505, 520, and 535 are loaded into the L2 memory layer. Next, tensor tile 510 is loaded from tensor 505 in the L2 memory layer into the L1 memory layer. Similarly, tensor tile 525 is loaded from tensor 520 in the L2 memory layer into the L1 memory layer. Then, tensor tile 515 is loaded from tensor 510 in the L1 memory layer into the L0 memory layer. In addition, tensor tile 530 is loaded from tensor 325 in the L1 memory layer into the L0 memory layer. Hardware execution unit 705 performs a matrix multiplication operation on tensor tiles 515 and 530, generates tensor tile 545 in the L0 memory layer, and stores the output of the matrix multiplication operator in tensor tile 545. Finally, tensor tile 545 is stored in tensor 535 in the L2 memory layer. The process is repeated for the remaining elements in tensor tiles 510 and 525 and then for the remaining elements in tensors 505 and 520 in order to implement the matrix multiplication operation between tensors 505 and 520 and produce the output in tensor 535.

FIG. 8 illustrates a process 800 for compiling a tensor operator for a neural network model based on a tensor tile configuration according to some embodiments. In some embodiments, computing system 110 performs process 700. Process 800 begins by receiving, at 810, a tensor expression for a neural network model. Referring to FIG. 1 as an example, neural network model manager 115 may receive a tensor expression for a neural network model (e.g., a tensor expression that specifies a matrix multiplication operator shown above) from client device 105.

Next, process 800 determines, at 820, a tensor tile configuration for the tensor expression based on specifications associated with a set of hardware devices. Referring to FIGS. 1 and 4 as an example, tile shape manager 120 can generated tensor tile configuration 400 for the tensor expression based on specifications associated with a set of hardware devices 140a-n.

Finally, process 800 generates, at 830, a set of code for implementing the tensor expression for the neural network model based on the tensor tile configuration. The set of code is for execution on the set of hardware. Referring to FIGS. 1, 4, and 6 as an example, tensor operator 125 may generate a set of code for implementing the logic shown in pseudocode 600 based on tensor tile configuration 400.

Figure 9:
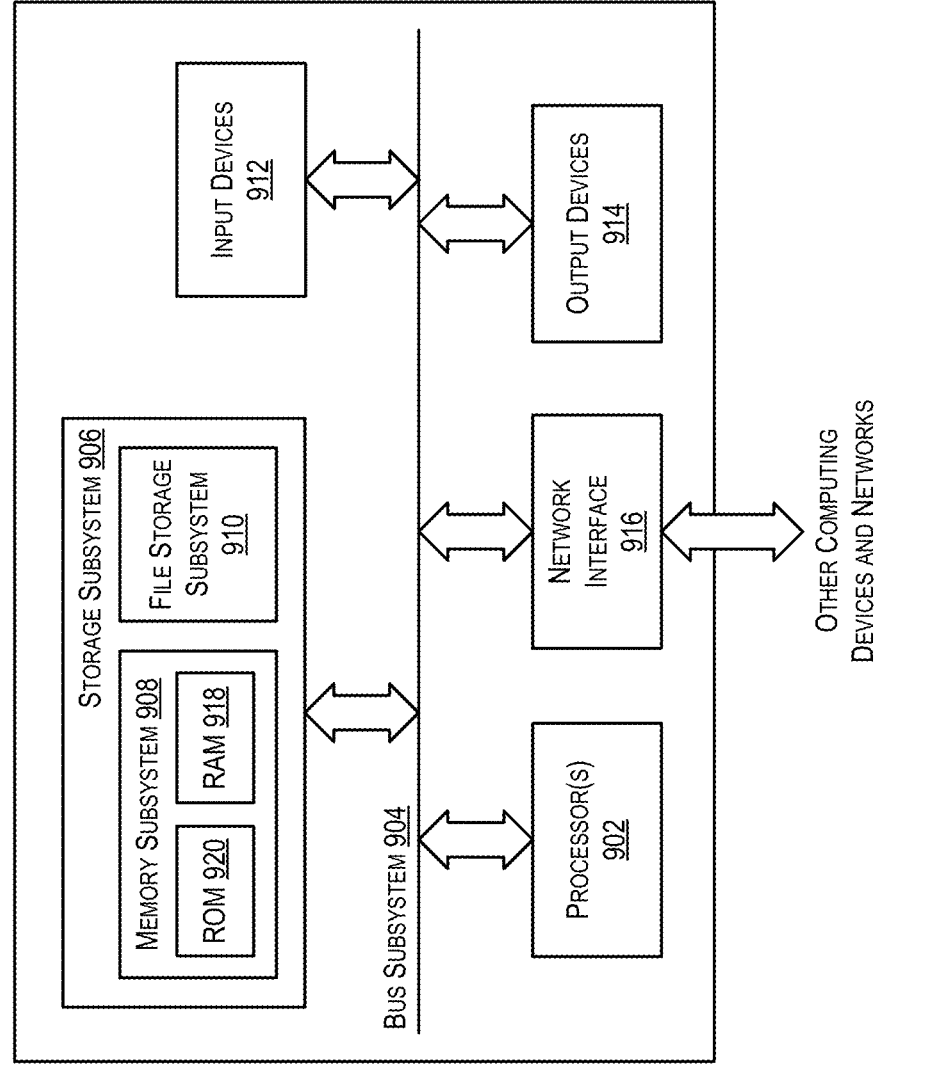
FIG. 9 depicts a simplified block diagram of an example computer system according to some embodiments.

The techniques describe above may be implemented in a wide range of computer systems configured to process neural networks. FIG. 9 depicts a simplified block diagram of an example computer system 900, which can be used to implement the techniques described in the foregoing disclosure. For example, computer system 900 may be used to implement client device 105, computing system 110, and hardware devices 140a-n. As shown in FIG. 9, computer system 900 includes one or more processors 902 that communicate with a number of peripheral devices via a bus subsystem 904. These peripheral devices may include a storage subsystem 906 (e.g., comprising a memory subsystem 908 and a file storage subsystem 910) and a network interface subsystem 916. Some computer systems may further include user interface input devices 912 and/or user interface output devices 914.

Bus subsystem 904 can provide a mechanism for letting the various components and subsystems of computer system 900 communicate with each other as intended. Although bus subsystem 904 is shown schematically as a single bus, alternative embodiments of the bus subsystem can utilize multiple busses.

Network interface subsystem 916 can serve as an interface for communicating data between computer system 900 and other computer systems or networks. Embodiments of network interface subsystem 916 can include, e.g., Ethernet, a Wi-Fi and/or cellular adapter, a modem (telephone, satellite, cable, ISDN, etc.), digital subscriber line (DSL) units, and/or the like.

Storage subsystem 906 includes a memory subsystem 908 and a file/disk storage subsystem 910. Subsystems 908 and 910 as well as other memories described herein are examples of non-transitory computer-readable storage media that can store executable program code and/or data that provide the functionality of embodiments of the present disclosure.

Memory subsystem 908 includes a number of memories including a main random access memory (RAM) 918 for storage of instructions and data during program execution and a read-only memory (ROM) 920 in which fixed instructions are stored. File storage subsystem 910 can provide persistent (e.g., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 900 is illustrative and many other configurations having more or fewer components than system 900 are possible.

FIG. 10 illustrates a neural network processing system according to some embodiments. In various embodiments, neural networks according to the present disclosure may be implemented and trained in a hardware environment comprising one or more neural network processors. A neural network processor may refer to various graphics processing units (GPU) (e.g., a GPU for processing neural networks produced by Nvidia Corp®), field programmable gate arrays (FPGA) (e.g., FPGAs for processing neural networks produced by Xilinx®), or a variety of application specific integrated circuits (ASICs) or neural network processors comprising hardware architectures optimized for neural network computations, for example. In this example environment, one or more servers 1002, which may comprise architectures illustrated in FIG. 9 above, may be coupled to a plurality of controllers 1010(1)-1010(M) over a communication network 1001 (e.g., switches, routers, etc.). Controllers 1010(1)-1010(M) may also comprise architectures illustrated in FIG. 9 above. Each controller 1010(1)-1010(M) may be coupled to one or more NN processors, such as processors 1011(1)-1011(N) and 1012(1)-1012(N), for example. NN processors 1011(1)-1011(N) and 1012(1)-1012(N) may include a variety of configurations of functional processing blocks and memory optimized for neural network processing, such as training or inference. The NN processors are optimized for neural network computations. Server 1002 may configure controllers 1010 with NN models as well as input data to the models, which may be loaded and executed by NN processors 1011(1)-1011(N) and 1012(1)-1012(N) in parallel, for example. Models may include layers and associated weights as described above, for example. NN processors may load the models and apply the inputs to produce output results. NN processors may also implement training algorithms described herein, for example.

Further Example Embodiments

In various embodiments, the present disclosure includes systems, methods, and apparatuses for compiling tensor operators for neural network models based on tensor tile configurations. The techniques described herein may be embodied in non-transitory machine-readable medium storing a program executable by a computer system, the program comprising sets of instructions for performing the techniques described herein. In some embodiments, a system includes a set of processing units and a non-transitory machine-readable medium storing instructions that when executed by at least one processing unit in the set of processing units cause the at least one processing unit to perform the techniques described above. In some embodiments, the non-transitory machine-readable medium may be memory, for example, which may be coupled to one or more controllers or one or more artificial intelligence processors, for example.

The following techniques may be embodied alone or in different combinations and may further be embodied with other techniques described herein.

For example, in one embodiment, the present disclosure includes a non-transitory machine-readable medium storing a program executable by at least one processing unit of a device, the program comprising sets of instructions for receiving a tensor expression for a neural network model; determining a tensor tile configuration for the tensor expression based on specifications associated with a set of hardware devices; and based on the tensor tile configuration, generating a set of code for implementing the tensor expression for the neural network model, the set of code for execution on the set of hardware.

In one embodiment, the specifications associated with the set of hardware include a number of threads that can be processed concurrently by a particular hardware device in the set of hardware devices. Determining the tensor tile configuration for the tensor expression comprises determining a size of a shape of a tensor tile for a tensor tile configuration in the tensor tile configuration that is a multiple of the number of threads that can be processed concurrently by the particular hardware device.

In one embodiment, the specifications associated with the set of hardware include a length of a memory transaction utilized by a hardware device in the set of hardware devices. Determining the tensor tile configuration for the tensor expression comprises determining a size of an inner-most dimension of a tensor tile that is a multiple of the length of a memory transaction.

In one embodiment, the specifications associated with the set of hardware include a number of memory banks into which memory included in a hardware device is divided and a width of the memory banks. The present disclosure further determines an amount of padding for the tensor expression based on the number of memory banks and the width of the memory banks.

In one embodiment, the tensor expression specifying a set of shapes for a set of input tensors, a shape for an output tensor, and a set of tensor operations operating on the set of inputs tensors to generate the output tensor.

In one embodiment, determining the tensor tile configuration for the tensor expression comprises determining a shape of a tensor tile into which the shape of an input tensor in the set of input tensors can be evenly partitioned.

In one embodiment, determining the tensor tile configuration for the tensor expression comprises determining a tensor tile configuration for a particular hardware device in the set of hardware devices; and replicating the tensor tile configuration for each hardware device in the set of hardware devices other than the particular hardware device.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A non-transitory machine-readable medium storing a program executable by at least one processing unit of a device, the program comprising sets of instructions for:

receiving a tensor expression for a neural network model, wherein the tensor expression specifies an operator that takes a set of input tensors, performs computations on the set of input tensors, and stores a result of the computations in an output tensor;

determining a tensor tile configuration for the tensor expression based on specifications associated with a set of hardware devices, the tensor tile configuration comprising a plurality of tensor tile shapes associated with the set of input tensors and the output tensor, the plurality of tensor tile shapes optimized for a plurality of memory layers of a memory architecture of a particular hardware device, wherein a different valid tensor tile shape with a highest memory metric is determined for each memory layer of the plurality of memory layers, wherein each tensor tile shape of the plurality of tensor tile shapes is associated with dimensions inferred from a tensor tile shape definition, the tensor tile shape definition associated with the tensor expression, and wherein the different valid tensor tile shape is determined based on a set of defined rules; and based on the tensor tile configuration comprising the plurality of tensor tile shapes, generating a set of code for implementing the tensor expression for the neural network model, the set of code for execution on the plurality of memory layers of the particular hardware device of the set of hardware devices.

2. The non-transitory machine-readable medium of claim 1, wherein the specifications associated with the set of hardware devices include a number of threads that can be processed concurrently by the particular hardware device in the set of hardware devices, wherein determining the tensor tile configuration for the tensor expression comprises determining a size of a shape of a tensor tile in the tensor tile configuration that is a multiple of the number of threads that can be processed concurrently by the particular hardware device.

3. The non-transitory machine-readable medium of claim 1, wherein the specifications associated with the set of hardware devices include a length of a memory transaction utilized by a hardware device in the set of hardware devices, wherein determining the tensor tile configuration for the tensor expression comprises determining a size of an inner-most dimension of a tensor tile that is a multiple of the length of a memory transaction.

4. The non-transitory machine-readable medium of claim 1, wherein the specifications associated with the set of hardware devices include a number of memory banks into which memory included in a hardware device is divided and a width of memory banks, wherein the program further comprises instructions for determining an amount of padding for the tensor expression based on the number of memory banks and the width of memory banks.

5. The non-transitory machine-readable medium of claim 1, wherein the tensor expression specifying a set of shapes for the set of input tensors, a shape for the output tensor, and a set of tensor operations operating on the set of input tensors to generate the output tensor.

6. The non-transitory machine-readable medium of claim 5, wherein determining the tensor tile configuration for the tensor expression comprises determining a shape of a tensor tile into which the shape of an input tensor in the set of input tensors can be evenly partitioned.

7. The non-transitory machine-readable medium of claim 1, wherein determining the tensor tile configuration for the tensor expression comprises replicating the tensor tile configuration for each hardware device in the set of hardware devices other than the particular hardware device.

8. A method comprising:

receiving a tensor expression for a neural network model, wherein the tensor expression specifies an operator that takes a set of input tensors, performs computations on the set of input tensors, and stores a result of the computations in an output tensor;

determining a tensor tile configuration for the tensor expression based on specifications associated with a set of hardware devices, the tensor tile configuration comprising a plurality of tensor tile shapes associated with the set of input tensors and the output tensor, the plurality of tensor tile shapes optimized for a plurality of memory layers of a memory architecture of a particular hardware device of the set of hardware devices, wherein a different valid tensor tile shape with a highest memory metric is determined for each memory layer of the plurality of memory layers, wherein each tensor tile shape of the plurality of tensor tile shapes is associated with dimensions inferred from a tensor tile shape definition, the tensor tile shape definition associated with the tensor expression, and wherein the different valid tensor tile shape is determined based on a set of defined rules; and based on the tensor tile configuration comprising the plurality of tensor tile shapes, generating a set of code for implementing the tensor expression for the neural network model, the set of code for execution on the plurality of memory layers of the particular hardware device of the set of hardware devices.

9. The method of claim 8, wherein the specifications associated with the set of hardware devices include a number of threads that can be processed concurrently by the particular hardware device in the set of hardware devices, wherein determining the tensor tile configuration for the tensor expression comprises determining a size of a shape of a tensor tile in the tensor tile configuration that is a multiple of the number of threads that can be processed concurrently by the particular hardware device.

10. The method of claim 8, wherein the specifications associated with the set of hardware devices include a length of a memory transaction utilized by a hardware device in the set of hardware devices, wherein determining the tensor tile configuration for the tensor expression comprises determining a size of an inner-most dimension of a tensor tile that is a multiple of the length of a memory transaction.

11. The method of claim 8, wherein the specifications associated with the set of hardware devices include a number of memory banks into which memory included in a hardware device is divided and a width of memory banks, the method further comprising determining an amount of padding for the tensor expression based on the number of memory banks and the width of memory banks.

12. The method of claim 8, wherein the tensor expression specifying a set of shapes for the set of input tensors, a shape for the output tensor, and a set of tensor operations operating on the set of input tensors to generate the output tensor.

13. The method of claim 12, wherein determining the tensor tile configuration for the tensor expression comprises determining a shape of a tensor tile into which the shape of an input tensor in the set of input tensors can be evenly partitioned.

14. The method of claim 8, wherein determining the tensor tile configuration for the tensor expression comprises replicating the tensor tile configuration for each hardware device in the set of hardware devices other than the particular hardware device.

15. A system comprising:
a set of processing units; and
a non-transitory machine-readable medium storing instructions that when executed by at least one processing unit in the set of processing units cause the at least one processing unit to:
receive a tensor expression for a neural network model, wherein the tensor expression specifies an operator that takes a set of input tensors, performs computations on the set of input tensors, and stores a result of the computations in an output tensor;
determine a tensor tile configuration for the tensor expression based on specifications associated with a set of hardware devices, the tensor tile configuration comprising a plurality of tensor tile shapes associated with the set of input tensors and the output tensor, the plurality of tensor tile shapes optimized for a plurality of memory layers of a memory architecture of a particular hardware device of the set of hardware devices, wherein a different valid tensor tile shape with a highest memory metric is determined for each memory layer of the plurality of memory layers, wherein each tensor tile shape of the plurality of tensor tile shapes is associated with dimensions inferred from a tensor tile shape definition, the tensor tile shape definition associated with the tensor expression, and wherein the different valid tensor tile shape is determined based on a set of defined rules; and
based on the tensor tile configuration comprising the plurality of tensor tile shapes, generate a set of code for implementing the tensor expression for the neural network model, the set of code for execution on the plurality of memory layers of the particular hardware device of the set of hardware devices.

16. The system of claim 15, wherein the specifications associated with the set of hardware devices include a number of threads that can be processed concurrently by the particular hardware device in the set of hardware devices, wherein determining the tensor tile configuration for the tensor expression comprises determining a size of a shape of a tensor tile in the tensor tile configuration that is a multiple of the number of threads that can be processed concurrently by the particular hardware device.

17. The system of claim 15, wherein the specifications associated with the set of hardware devices include a length of a memory transaction utilized by a hardware device in the set of hardware devices, wherein determining the tensor tile configuration for the tensor expression comprises determining a size of an inner-most dimension of a tensor tile that is a multiple of the length of a memory transaction.

18. The system of claim 15, wherein the specifications associated with the set of hardware devices include a number of memory banks into which memory included in a hardware device is divided and a width of memory banks, wherein the instructions further cause the at least one processing unit to determine an amount of padding for the tensor expression based on the number of memory banks and the width of memory banks.

19. The system of claim 15, wherein the tensor expression specifying a set of shapes for the set of input tensors, a shape for the output tensor, and a set of tensor operations operating on the set of input tensors to generate the output tensor.

20. The system of claim 19, wherein determining the tensor tile configuration for the tensor expression comprises determining a shape of a tensor tile into which the shape of an input tensor in the set of input tensors can be evenly partitioned.

* * * * *